United States Patent [19]

Friday et al.

[11] 3,898,454

[45] Aug. 5, 1975

[54] OPTICAL AIR DATA SENSOR

[75] Inventors: Robert E. Friday, Lenexa; Ralph V. Cole, Olathe, both of Kans.

[73] Assignee: King Radio Corporation, Olathe, Kans.

[22] Filed: Aug. 27, 1973

[21] Appl. No.: 392,016

[52] U.S. Cl. ...... 250/231 P; 250/204 R; 250/237 R
[51] Int. Cl. ............................................. G01d 5/34
[58] Field of Search ....... 250/231 R, 231 SE, 231 P, 250/221, 222, 204, 205, 209, 237 R, 237 G; 307/311

[56] References Cited
UNITED STATES PATENTS

| | | | |
|---|---|---|---|
| 3,100,997 | 8/1963 | Lorenz | 250/231 P |
| 3,628,024 | 12/1971 | Ciemochowski | 250/231 P |
| 3,654,480 | 4/1972 | Stephenson | 250/231 R |
| 3,673,607 | 6/1972 | Hoeffel | 307/311 |
| 3,721,123 | 3/1973 | Heim | 250/231 SE |
| 3,742,233 | 6/1973 | Gorgens | 250/231 P |
| 3,783,277 | 1/1974 | Younkin | 250/237 |

*Primary Examiner*—James W. Lawrence
*Assistant Examiner*—D. C. Nelms
*Attorney, Agent, or Firm*—Lowe, Kokjer, Kircher

[57] ABSTRACT

An optical servo mechanism transmits data corresponding to variations in pressure, said data being derived from an associated aneroid.

In the preferred embodiment a pair of adjacently located light emitting diodes are excited out of phase with each other and emit light to a photoconductive receiver element. Interposed between the diodes and the photoconductor is an aneroid operated shutter mechanism having diagonally opposed windows through which the diode light must pass. Aneroid induced shutter displacement will variably impede light propagation from the diodes, resulting in varying illumination of the photo conductor. Phase information in the output signal thereby generated will indicate the direction of pressure change, while the output signal amplitude will correspond to the amount of pressure change.

7 Claims, 9 Drawing Figures

PATENTED AUG 5 1975　　　　　　　　　　　　　　　　3,898,454
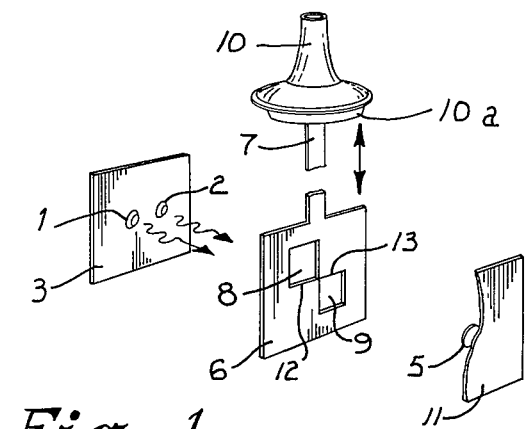
Fig. 1.
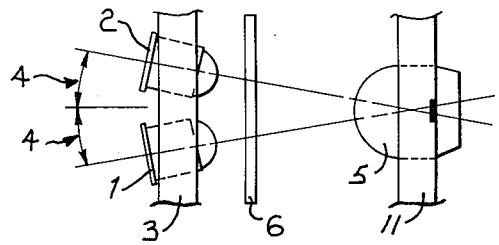
Fig. 2.
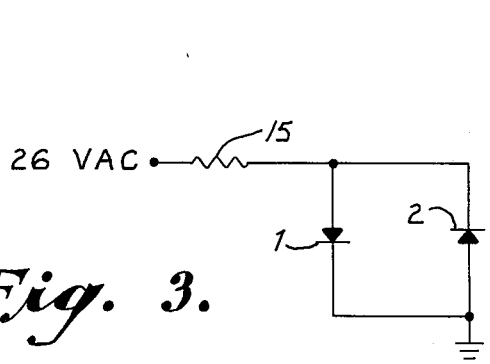
Fig. 3.
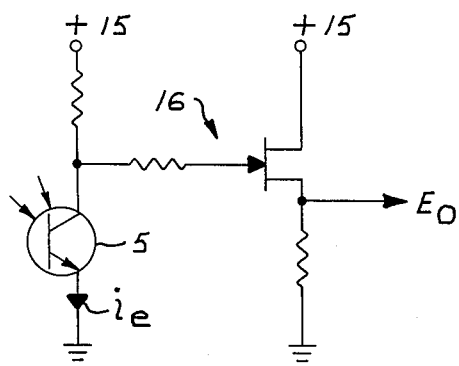
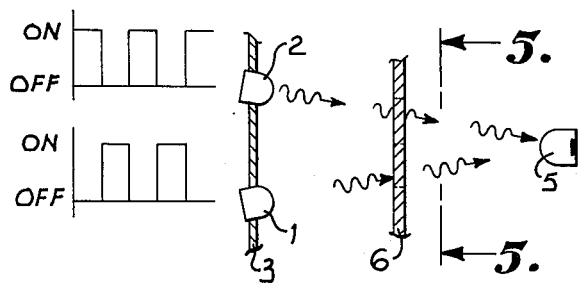
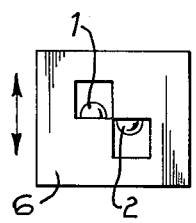
Fig. 5.
Fig. 4.
Fig. 6.
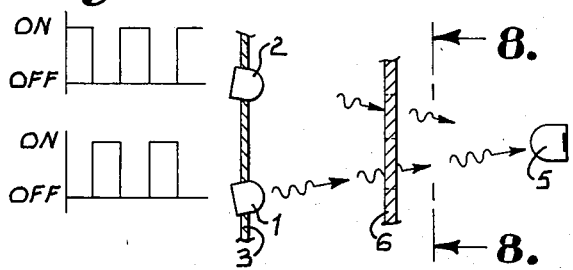
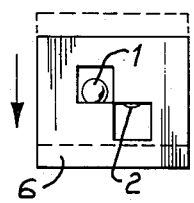
Fig. 7.
Fig. 8.
Fig. 9.

OPTICAL AIR DATA SENSOR

BACKGROUND AND BRIEF DESCRIPTION OF THE INVENTION

This invention relates to an air data avionics system which includes the measurement of pressure, and more particularly to the measurement and detection of expansions and contractions in pressure sensitive aneroids associated therewith.

It is well known in the prior art to measure pressure by use of a pressure sensitive aneroid which generally includes an expansible element producing either motion or force under applied pressure. This motion is transmitted to an appropriate sensing device such as a gauge or a meter via appropriate linkages. Alternatively the motion may operate an electrical transducer, such as a potentiometer where a linkage from the aneroid is used to vary resistance, thereby obtaining an electrical output signal.

However, inaccuracies in measurement result from the effects of mechanical linkages on the aneroid. Weight and mechanical complexity of the linkage decrease reliability and increase wear susceptibility. Intricate linkage designs also contribute to manufacturing costs and assembly time. Furthermore, the need for maintenance is enhanced. Accordingly, one of the primary objects of the subject invention is to minimize the effects of a data sensing system on an associated aneroid. This object is accomplished, in part, by two light emitting diodes which are excited out of phase. The light emanating therefrom is directed through the windows of a shutter mechanism toward a photocell. An aneroid is mechanically connected to the shutter mechanism so that when a pressure change occurs, displacement of the shutter will result, thereby variably impeding the diode light transmission paths.

The photocell (or light sensitive device) will receive a variable amount of light, and it's response will thus be a function of aneroid displacement. This arrangement avoids the need for any physical connection between the aneroid itself and the external sensing circuitry or apparatus. The aneroid is connected only to the small light-weight shutter plate, thereby requiring a minimum of work effort and permitting the reduction of any necessary linkage to an extremely economical, small and lightweight structure.

It is a further object of this device to provide an air data system comprising a unique aneroid sensor system which may be manufactured at significantly lower costs than prior art devices. The unique simplicity of the device minimizes assembly time and permits utilization of components whose costs are relatively lower than what was heretofore required in prior art systems.

It is yet another object of this invention to provide an air data system including an aneroid sensor having extremely high reliability. It is a feature of this object that the aneroid need only displace a small lightweight shutter plate thereby simplifying the associated linkage. Consequently, frictional losses will be minimized. As there are very few moving parts, the deleterious influence of dust and dirt will likewise be minimized.

Other and further objects of this invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views:

FIG. 1 is a perspective and partially fragmentary view of the aneroid sensing device;

FIG. 2 is a top plan view of the device as in FIG. 1 with the aneroid omitted;

FIG. 3 is a schematic diagram of the associated electronic circuitry;

FIG. 4 is a pictorial representation of the operation of the device with no shutter displacement;

FIG. 5 is a view of the shutter mechanism taken along line 5—5 of FIG. 4 in the direction of the arrows;

FIG. 6 graphically depicts photocell current when the light emitting diodes equally illuminate the photocell, as in FIG. 4;

FIG. 7 is a pictorial representation of the operation of the device with a small shutter displacement;

FIG. 8 is a view of the shutter mechanism taken along line 8—8 of FIG. 7, in the direction of the arrows; and FIG. 9 graphically depicts the square wave photocell current response which occurs when less light is transmitted to the photocell from one diode than from the other, as in FIG. 7.

In FIG. 1, light emitting diodes 1 and 2 are mounted in the same horizontal plane on plate 3 and are aimed at photocell 5. As seen in FIG. 2, diodes 1 and 2 extend through plate 3 and are offset from the perpendicular at an angle 4. This angle is a function of the distance between the diodes and the distance from the diodes to photocell 5 on mounting plate 11.

Interposed between the diodes and photocell 5 is a shutter surface 6 having diagonally opposite windows 8 and 9 extending therethrough. Aneroid 10 is connected to shutter 6 by linkage 7, and consequently displacement of the shutter will occur when the aneroid responds to pressure changes. The aneroid 10 will expand or contract resulting in the linkage displacement.

As seen in FIG. 1, the bottom edge 12 of window 8 in shutter 6 is on the same horizontal plane as the upper edge 13 of window 9. Correspondingly, diodes 1 and 2 are positioned relative thereto so that with shutter 6 in a zero displacement position, one half of the light beam generated by each one of the diodes will be transmitted through its respective window onto the photocell 5. Accordingly, if the shutter is displaced downwardly due to corresponding air pressure changes, upper edge 13 of window 9 will further interrupt light from diode 2, while light reaching the photocell from diode 1 will be increased. For upward displacement of shutter 6, the situation will be exactly reversed.

As shown in FIG. 3, current, limited by resistor 15, will alternately flow in diodes 1 and 2. When one of the diodes is on, the other will be off. Thus a square wave response would result in photocell 5 if either of the diodes were transmitting alone. The output of photocell 5 is amplified at amplifier 16 to develop a suitable control signal for appropriate external circuitry, as will be described later.

In FIG. 4 shutter 6 is in a reference position so that an equal amount of light from each of the diodes reaches photocell 5. The shutter position is more adequately shown in FIG. 5. Since the diodes are equally bright, and one is always on when the other is off, the photocell will have current designated as $i_e$ normally flowing therethrough (FIG. 6). In FIG. 7 the shutter has been displaced downward, and light from one of the diodes has been attenuated while light reaching the photocell from the other has increased. Shutter position in this case is illustrated in FIG. 8. In the interval when the transmitting diode is being masked by the shutter, the photocell current will drop because of the reduction of illumination. When the unmasked diode transmits the photocell current will increase beyond the zero shutter displacement state because more than one-half of the light emanating from that diode will now reach the photocell.

From the above, it will be seen that a square wave photocell response (as shown in FIG. 9) will thus be developed. The phase of this photocell signal is dependent upon the shutter displacement direction, and it will be equal to the excitation phase of the diode having the greatest exposure. If shutter 6 were upwardly displaced, light from the opposite diode would be blocked and the resulting photocell signal would differ from FIG. 9 by 180°. A conventional phase detection circuit external to the described device will determine the direction of shutter displacement.

The amplitude of the photocell signal is linearly related to the amount of shutter displacement. However, care must be taken to insure that the photocell does not reach an oversaturated condition. As long as this is done the photocell current will respond to the slightest of shutter movements. Further, the above-mentioned phase detection circuit, in conjunction with an aneroid measuring device, will permit accurate air data variations to be used with related systems. For example, the signal from amplifier 16 may be coupled to suitable display apparatus to read altitude, or it may be delivered to an external data system servo loop. In the latter case a reference may be established from a measuring air data parameter. If external means are provided to reset the aneroid to a "zero" position, then subsequent deviations from this reference may be measured.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An optical air data sensor avionics system for use with a pressure sensitive aneroid, the system comprising:

a light activated sensor element having a signal output therefrom;

at least two effective light sources, said light sources remotely located from said sensor element and operable to variably illuminate same;

a shutter located between said light sources and said light activated sensor and operable to variably impede light passage between said sources and said sensor, said shutter defining at least two openings to allow the passage of light from a respective source therethrough;

means interconnecting said shutter and said aneroid to effect the movement of said shutter in accordance with the pressure being sensed by said aneroid;

said openings and said sources being arranged to inversely vary light transmission therethrough to said sensor in accordance with said shutter movement; and said signal output from said sensor element being variable in accordance with the direction and amount of said shutter movement.

2. The combination as in claim 1 wherein said light source is comprised of a pair of light emitting diodes.

3. The combination as in claim 2 including means for energizing said light emitting diodes 180° out of phase with each other.

4. The combination as in claim 3 wherein said shutter defines openings oriented at diagonally opposite locations within the shutter.

5. A method for converting aneroid displacement in an avionics air data system into an electrical signal, said method including the steps of generating light from two effective light sources;

directing said generated light along a path toward a photo sensitive element from each source;

interrupting each of said light paths by a shutter mechanism having two openings defined therein; each of said openings permitting corresponding light paths to be directed therethrough;

coupling said shutter to said aneroid thereby variably impeding each of said light paths to correspondingly variably illuminate said photo sensitive element; and detecting and amplifying the output of said photo sensitive element.

6. The method as in claim 5 wherein said generating step includes the further step of alternately energizing each of a pair of adjacently located light emitting diodes to accomplish said generation of light.

7. The method as in claim 6 including the step of directing the output of said light emitting diodes toward a pair of diagonally opposite rectangular openings in said shutter.

* * * * *